June 17, 1930.  R. J. COOPER  1,764,039
RICE COOKING DEVICE
Filed Aug. 29, 1929

INVENTOR.
Ruth J. Cooper
BY John M. Spellman
ATTORNEY.

Patented June 17, 1930

1,764,039

UNITED STATES PATENT OFFICE

RUTH J. COOPER, OF DALLAS, TEXAS

RICE-COOKING DEVICE

Application filed August 29, 1929. Serial No. 389,162.

This invention relates to new and useful improvements in cooking utensils, particulary for the cooking of rice.

The particular object of the invention is to provide a new and novel means for cooking rice, in the form of a spherical cage, so that the rice when cooked will have the shape and contour of a ball. Rice when prepared for consumption in this attractive manner can be cooked easily and the nutritive qualities of the grain utilized to the fullest extent.

The invention also embodies the features of economy in construction and durability, in addition to sanitary advantage.

The invention will be clearly understood from a perusal of the following detailed description, taken in connection with the accompanying drawings forming part of this specification, and wherein.

Figure 1:
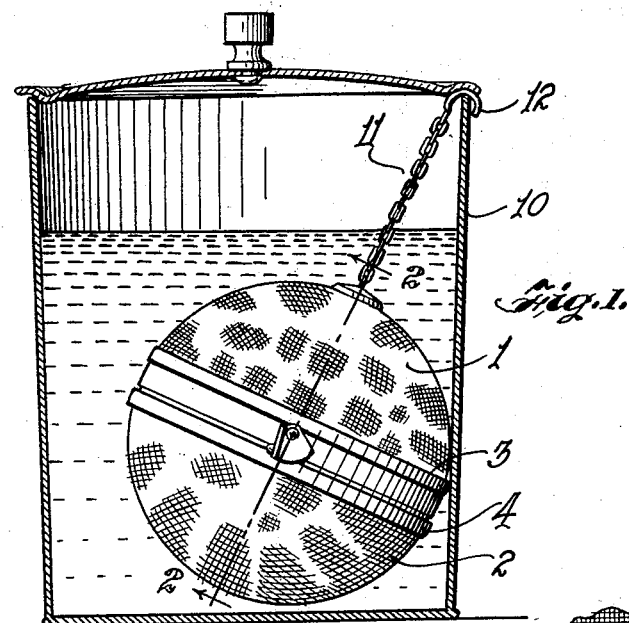
Figure 1 is a vertical sectional view through a cooking vessel and illustrating the invention in operable position therein.
Figures 2, 4:
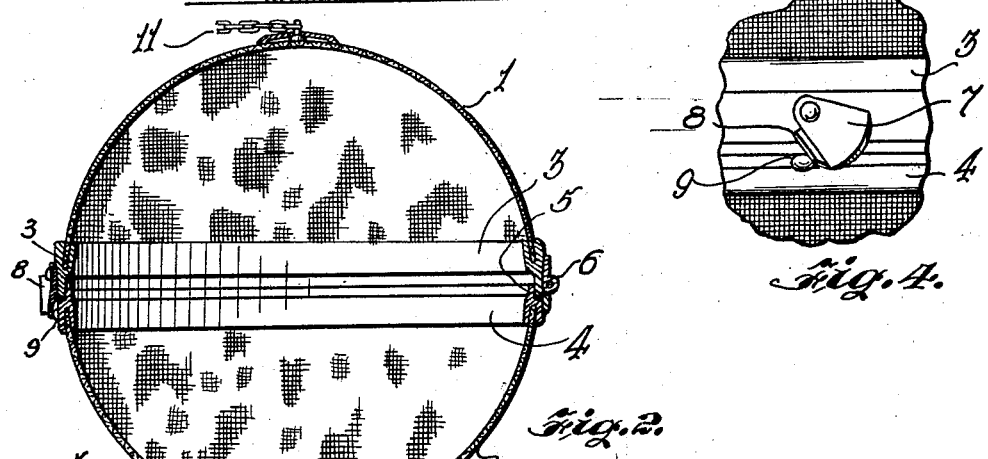
Figure 2 is a sectional view through the ball or spherical cage, the view being taken along the line 2—2 of Figure 1.
Figure 4 is a fragmentary detail view of the cage, showing the mode of connecting the two parts thereof.
Figure 3:
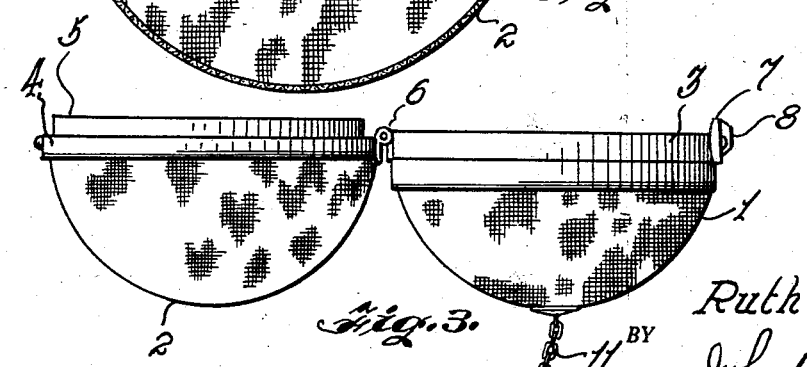
Figure 3 is an elevational view of the ball or cage opened out.

Referring more closely to the drawings, and wherein the various parts of the invention will be pointed out by numerals, the ball or cage is constructed in two equal parts, 1 and 2. Each part is semi-spherical and is of screen wire of such size mesh as to retain the rice grains in the two parts constituting the cage or ball. The edge of the upper half or part 1 is provided with a band 3 and the lower half or part 2 has secured thereto a band 4. The construction of these parts is such that the upper band 3 will close over a part of the lower band, reduced in diameter at 5, when the cage is closed, thereby sealing the two parts. The bands are hinged together at 6, and a fastening means is shown at 7, the tines of a fork being placed alongside the projection 8 to operate the fastening means. A protuberance 9 forms a catch for the fastener.

In Figure 1 is illustrated a cooking vessel 10 in which the ball or cage may be placed. A chain 11 with hook 12 holds the ball in suspended position. The object of the chain is to hold the ball or cage in a suspended position in the water. The chain may therefore be attached to any convenient part of the vessel into which the ball is hung.

While the disclosure illustrates a practical embodiment of the invention, obviously the cage or ball may be modified in construction, such alterations or changes to come within the scope and meaning of the following claim.

What is claimed as new is:

A hollow foraminous sphere for cooking rice and the like, and adapted to be loosely suspended at one point only within a cooking vessel containing water, said ball comprising two semispherical members, both of foraminous material, upper and lower bands, one secured to each of said foraminous members, one of said bands having a reduced portion, a shoulder at the juncture of the said reduced portion with the remainder of the band, the other band fitting over said reduced portion and limited by said shoulder, said bands being hinged together at one side and having detachable fastening means opposite the hinge, said fastening means comprising a protuberance on one of the bands and a catch rotatably mounted on the other band and adapted to coact with the protuberance, and a chain-like suspension member secured to one of said semispherical members, said member constituting the sole means of suspension for said ball, whereby free movement of the ball in all directions within the cooking vessel is permitted.

In testimony whereof I affix my signature.

RUTH J. COOPER.